(12) United States Patent
Cho et al.

(10) Patent No.: US 11,314,131 B2
(45) Date of Patent: Apr. 26, 2022

(54) DISPLAY DEVICE INCLUDING PIXELS WITH DIFFERENTLY ANGLED STEM AND BRANCH PORTIONS

(71) Applicant: SAMSUNG DISPLAY CO., LTD., Yongin-si (KR)

(72) Inventors: Dong Beom Cho, Hwaseong-si (KR); Dong Won Park, Asan-si (KR); Song Yi Han, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 33 days.

(21) Appl. No.: 15/962,304

(22) Filed: Apr. 25, 2018

(65) Prior Publication Data

US 2019/0079325 A1    Mar. 14, 2019

(30) Foreign Application Priority Data

Sep. 12, 2017    (KR) ........................ 10-2017-0116835

(51) Int. Cl.
*G02F 1/1343*    (2006.01)
*G02F 1/1337*    (2006.01)
*G02F 1/1362*    (2006.01)
*G02F 1/1335*    (2006.01)

(52) U.S. Cl.
CPC ...... *G02F 1/134309* (2013.01); *G02F 1/1337* (2013.01); *G02F 1/133514* (2013.01); *G02F 1/134363* (2013.01); *G02F 1/136286* (2013.01); *G02F 1/134345* (2021.01); *G02F 1/134372* (2021.01); *G02F 2201/121* (2013.01); *G02F 2201/123* (2013.01)

(58) Field of Classification Search
CPC combination set(s) only.
See application file for complete search history.

(56) References Cited

U.S. PATENT DOCUMENTS

| | | |
|---|---|---|
| 8,791,969 B2 | 7/2014 | Kim et al. |
| 2007/0195231 A1 | 8/2007 | Kuribayashi et al. |
| 2011/0109858 A1* | 5/2011 | Chen .................. G02F 1/134309 349/139 |
| 2013/0101755 A1* | 4/2013 | Lee .................... G02F 1/133711 428/1.23 |

(Continued)

FOREIGN PATENT DOCUMENTS

| | | |
|---|---|---|
| KR | 10-2007-0083198 | 8/2007 |
| KR | 100861435 | 9/2008 |

(Continued)

*Primary Examiner* — Lauren Nguyen
(74) *Attorney, Agent, or Firm* — F. Chau & Associates, LLC

(57) ABSTRACT

A display device includes a substrate; and a red pixel electrode, a green pixel electrode, and a blue pixel electrode disposed on the substrate. Each of the red pixel electrode, the green pixel electrode, and the blue pixel electrode includes a transverse stem portion, a longitudinal stem portion, and a fine branch portion. An angle between the transverse stem portion and the fine branch portion of the red pixel electrode, an angle between the transverse stem portion and the fine branch portion of the green pixel electrode, and an angle between the transverse stem portion and the fine branch portion of the blue pixel electrode are different from each other.

9 Claims, 16 Drawing Sheets

(56) References Cited

U.S. PATENT DOCUMENTS

| | | | |
|---|---|---|---|
| 2013/0314640 A1* | 11/2013 | Kang | G02F 1/133707 |
| | | | 349/61 |
| 2015/0070644 A1* | 3/2015 | Lee | G02F 1/134309 |
| | | | 349/142 |
| 2015/0124202 A1 | 5/2015 | Kang | |
| 2015/0205157 A1* | 7/2015 | Sakai | G02F 1/13363 |
| | | | 349/62 |

FOREIGN PATENT DOCUMENTS

| | | |
|---|---|---|
| KR | 1020110111212 | 10/2011 |
| KR | 10-2012-0013552 | 2/2012 |
| KR | 10-2015-0060447 | 6/2015 |
| KR | 1020160084938 | 7/2016 |
| KR | 1020160101819 | 8/2016 |
| KR | 101731842 | 4/2017 |

* cited by examiner

DISPLAY DEVICE INCLUDING PIXELS WITH DIFFERENTLY ANGLED STEM AND BRANCH PORTIONS

CROSS-REFERENCE TO RELATED APPLICATION

This application claims priority to Korean Patent Application No. 10-2017-0116835 filed in the Korean Intellectual Property Office on Sep. 12, 2017, the disclosure of which is incorporated by reference herein in its entirety.

(a) TECHNICAL FIELD

Exemplary embodiments relate to a display device, and more particularly to a display device including pixels with stem and branch portions.

(b) DISCUSSION OF RELATED ART

A liquid crystal display may be a flat panel display device that includes two display panels where field generating electrodes such as a pixel electrode and a common electrode are formed, and a liquid crystal layer disposed therebetween.

The liquid crystal display may generate an electric field in a liquid crystal layer by applying voltages to the field generating electrodes, to determine orientations of liquid crystal molecules of the liquid crystal layer and control polarization of incident light, thus displaying an image.

Among the liquid crystal displays, a vertical alignment (VA) mode liquid crystal display may have a longitudinal axis of liquid crystal molecules that is perpendicular to upper and lower panels in the absence of an electric field, and thus a contrast ratio may be relatively high and a reference viewing angle may be relatively wide.

In the vertical alignment (VA) mode liquid crystal display, to obtain the wide viewing angle, a plurality of domains in which the alignment direction of the liquid crystal molecules are different may be formed in one pixel.

To form the plurality of domains, a method of forming cutouts such as minute slits in the field generating electrode or protrusions on the field generating electrode may be used. The plurality of domains may be created by aligning the liquid crystal molecules in a direction perpendicular to a fringe field that is generated between edges of the cutouts or protrusions and the field generating electrodes facing the edges thereof.

The transmittance may change according to the fine slit angle of these liquid crystal displays. However, when setting the fine slit angle according to optimum transmittance of one pixel among red, green, and blue pixels, the transmittance of the other color pixels may decrease.

SUMMARY OF THE INVENTION

An exemplary embodiment provides a display device having increased transmittance of each pixel.

A display device according to an exemplary embodiment includes a substrate; and a red pixel electrode, a green pixel electrode, and a blue pixel electrode disposed on the substrate. Each of the red pixel electrode, the green pixel electrode, and the blue pixel electrode includes a transverse stem portion, a longitudinal stem portion, and a fine branch portion. An angle between the transverse stem portion and the fine branch portion of the red pixel electrode, an angle between the transverse stem portion and the fine branch portion of the green pixel electrode, and an angle between the transverse stem portion and the fine branch portion of the blue pixel electrode are different from each other.

The angle between the transverse stem portion and the fine branch portion of the red pixel electrode may be smaller than the angle between the transverse stem portion and the fine branch portion of the green pixel electrode.

The angle between the transverse stem portion and the fine branch portion of the blue pixel electrode may be larger than the angle between the transverse stem portion and the fine branch portion of the green pixel electrode.

The display device according to an exemplary embodiment may include an absorption polarizer disposed under the substrate.

The angle between the transverse stem portion and the fine branch portion of the green pixel electrode may be about 45 degrees. The angle between the transverse stem portion and the fine branch portion of the red pixel electrode may be from about 41.83 degrees to about 45 degrees. The angle between the transverse stem portion and the fine branch portion of the blue pixel electrode may from about 45 degrees to about 49.75 degrees.

The angle between the transverse stem portion and the fine branch portion of the blue pixel electrode may be about 45 degrees. The angle between the transverse stem portion and the fine branch portion of the green pixel electrode may be from about 44.27 degrees to about 45 degrees. The angle between the transverse stem portion and the fine branch portion of the red pixel electrode may be from about 43.77 degrees to about 45 degrees.

The angle between the transverse stem portion and the fine branch portion of the red pixel electrode may be about 45 degrees. The angle between the transverse stem portion and the fine branch portion of the green pixel electrode may be from about 45 degrees to about 45.82 degrees. The angle between the transverse stem portion and the fine branch portion of the blue pixel electrode may be from about 45 degrees to about 51.5 degrees.

The display device according to an exemplary embodiment may include a reflective polarizer disposed under the substrate.

The angle between the transverse stem portion and the fine branch portion of the green pixel electrode may be about 45 degrees. The angle between the transverse stem portion and the fine branch portion of the red pixel electrode may be from about 43.96 degrees to about 45 degrees. The angle between the transverse stem portion and the fine branch portion of the blue pixel electrode may be from about 45 degrees to about 46.56 degrees.

The angle between the transverse stem portion and the fine branch portion of the blue pixel electrode may be about 45 degrees. The angle between the transverse stem portion and the fine branch portion of the green pixel electrode may be from about 40.45 degrees to about 45 degrees. The angle between the transverse stem portion and the fine branch portion of the red pixel electrode may be from about 37.41 degrees to about 45 degrees.

The angle between the transverse stem portion and the fine branch portion of the red pixel electrode may be about 45 degrees. The angle between the transverse stem portion and the fine branch portion of the green pixel electrode may be from about 45 degrees to about 47.96 degrees. The angle between the transverse stem portion and the fine branch portion of the blue pixel electrode may be from about 45 degrees to about 49.75 degrees.

The display device according to an exemplary embodiment may include a white pixel electrode disposed on the substrate. The white pixel electrode may include a transverse stem portion, a longitudinal stem portion, and a fine branch portion. The angle between the transverse stem portion and the fine branch portion of the white pixel electrode may be different from the angle between the transverse stem portion and the fine branch portion of the red pixel electrode, the angle between the transverse stem portion and the fine branch portion of the green pixel electrode, and the angle between the transverse stem portion and the fine branch portion of the blue pixel electrode.

A display device according to an exemplary embodiment includes a substrate; and a red pixel electrode, a green pixel electrode, and a blue pixel electrode disposed on the substrate. Each of the red pixel electrode, the green pixel electrode, and the blue pixel electrode includes a first sub-pixel electrode and a second sub-pixel electrode. Each of the first sub-pixel electrode and the second sub-pixel electrode of the red pixel electrode, the first sub-pixel electrode and the second sub-pixel electrode of the green pixel electrode, and the first sub-pixel electrode and the second sub-pixel electrode of the blue pixel electrode includes a transverse stem portion, a longitudinal stem portion, and a fine branch portion. An angle between the transverse stem portion and the fine branch portion of the first sub-pixel electrode of the red pixel electrode, an angle between the transverse stem portion and the fine branch portion of the first sub-pixel electrode of the green pixel electrode, and an angle between the transverse stem portion and the fine branch portion of the first sub-pixel electrode of the blue pixel electrode are different from each other.

The angle between the transverse stem portion and the fine branch portion of the first sub-pixel electrode of the red pixel electrode may be smaller than the angle between the transverse stem portion and the fine branch portion of the first sub-pixel electrode of the green pixel electrode. The angle between the transverse stem portion and the fine branch portion of the first sub-pixel electrode of the blue pixel electrode may be larger than the angle between the transverse stem portion and the fine branch portion of the first sub-pixel electrode of the green pixel electrode.

The angle between the transverse stem portion and the fine branch portion of the second sub-pixel electrode of the red pixel electrode may be smaller than the angle between the transverse stem portion and the fine branch portion of the second sub-pixel electrode of the green pixel electrode. The angle between the transverse stem portion and the fine branch portion of the second sub-pixel electrode of the blue pixel electrode may be larger than the angle between the transverse stem portion and the fine branch portion of the second sub-pixel electrode of the green pixel electrode.

The angle between the transverse stem portion and the fine branch portion of the second sub-pixel electrode of the red pixel electrode, the angle between the transverse stem portion and the fine branch portion of the second sub-pixel electrode of the green pixel electrode, and the angle between the transverse stem portion and the fine branch portion of the second sub-pixel electrode of the blue pixel electrode may be the same as each other.

A display device according to an exemplary embodiment includes a substrate; and a red pixel electrode, a green pixel electrode, and a blue pixel electrode disposed on the substrate. Each of the red pixel electrode, the green pixel electrode, and the blue pixel electrode includes a first sub-pixel electrode and a second sub-pixel electrode. Each of the first sub-pixel electrode and the second sub-pixel electrode of the red pixel electrode, the first sub-pixel electrode and the second sub-pixel electrode of the green pixel electrode, and the first sub-pixel electrode and the second sub-pixel electrode of the blue pixel electrode includes a transverse stem portion, a longitudinal stem portion, and a fine branch portion. An angle between the transverse stem portion and the fine branch portion of the second sub-pixel electrode of the red pixel electrode, an angle between the transverse stem portion and the fine branch portion of the second sub-pixel electrode of the green pixel electrode, and an angle between the transverse stem portion and the fine branch portion of the second sub-pixel electrode of the blue pixel electrode are different from each other.

The angle between the transverse stem portion and the fine branch portion of the second sub-pixel electrode of the red pixel electrode may be smaller than the angle between the transverse stem portion and the fine branch portion of the second sub-pixel electrode of the green pixel electrode. The angle between the transverse stem portion and the fine branch portion of the second sub-pixel electrode of the blue pixel electrode may be larger than the angle between the transverse stem portion and the fine branch portion of the second sub-pixel electrode of the green pixel electrode.

The angle between the transverse stem portion and the fine branch portion of the first sub-pixel electrode of the red pixel electrode, the angle between the transverse stem portion and the fine branch portion of the first sub-pixel electrode of the green pixel electrode, and the angle between the transverse stem portion and the fine branch portion of the first sub-pixel electrode of the blue pixel electrode may be the same as each other.

According to an exemplary embodiment, by differentiating the angle of the fine slits of the different color pixels from each other, the transmittance of each pixel may be increased.

BRIEF DESCRIPTION OF THE DRAWINGS

The above and other features will become more apparent by describing in detail exemplary embodiments thereof with reference to the accompanying drawings, in which.

DETAILED DESCRIPTION OF THE EMBODIMENTS

Figure 1:
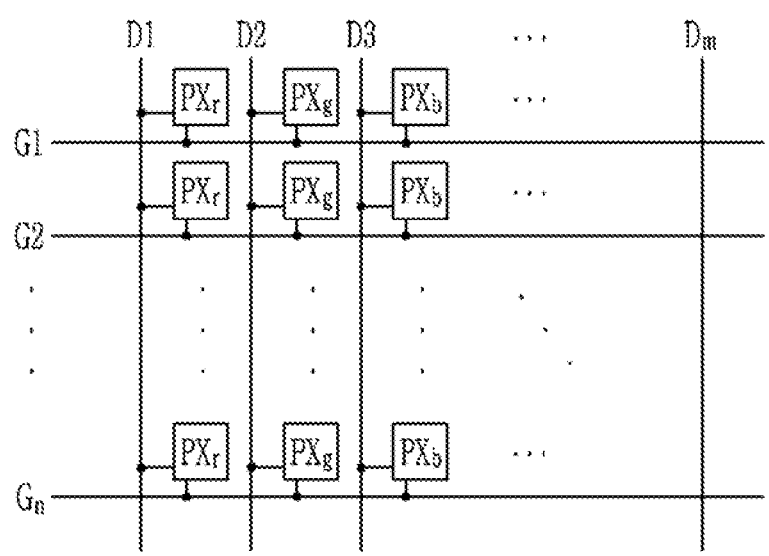
FIG. 1 is a schematic view of a display device according to an exemplary embodiment.

Exemplary embodiments will be described below in more detail with reference to the accompanying drawings. In this regard, the exemplary embodiments may have different forms and should not be construed as being limited to the exemplary embodiments described herein.

Like reference numerals may refer to like elements throughout the specification and drawing.

Sizes of elements in the drawings may be exaggerated for clarity of description.

It will be understood that when a component, such as a layer, a film, a region, or a plate, is referred to as being "on" another component, the component may be directly on the other component or intervening components may be present.

The phrases "on a plane" or "a plan view" mean viewing the object portion from the top, and the phrases "on a cross-section" or "a cross-sectional view" mean viewing a cross-section of which the object portion is vertically cut and illustrated from the side.

A display device according to an exemplary embodiment will be described in more detail below with reference to FIG. 1 to FIG. 6.

Figure 2:
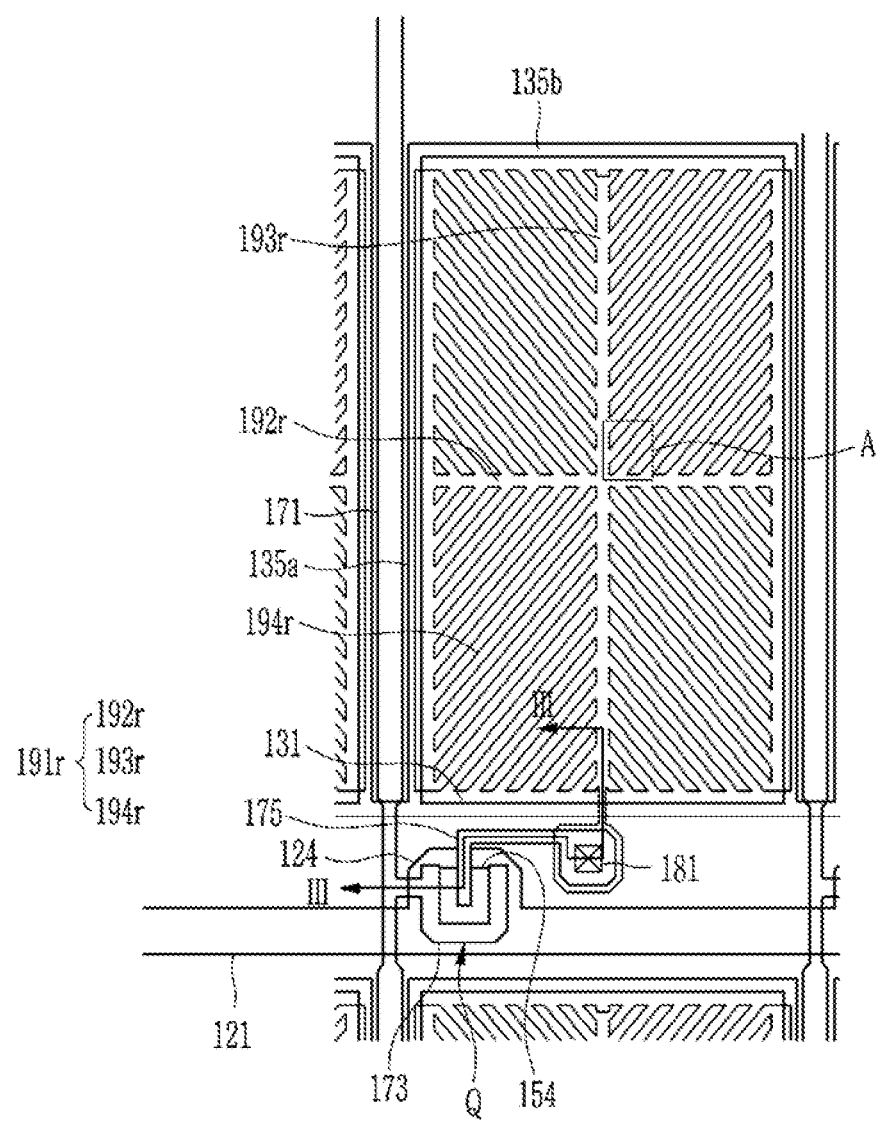
FIG. 2 is a top plan view showing one pixel of a display device according to an exemplary embodiment.
Figure 3:
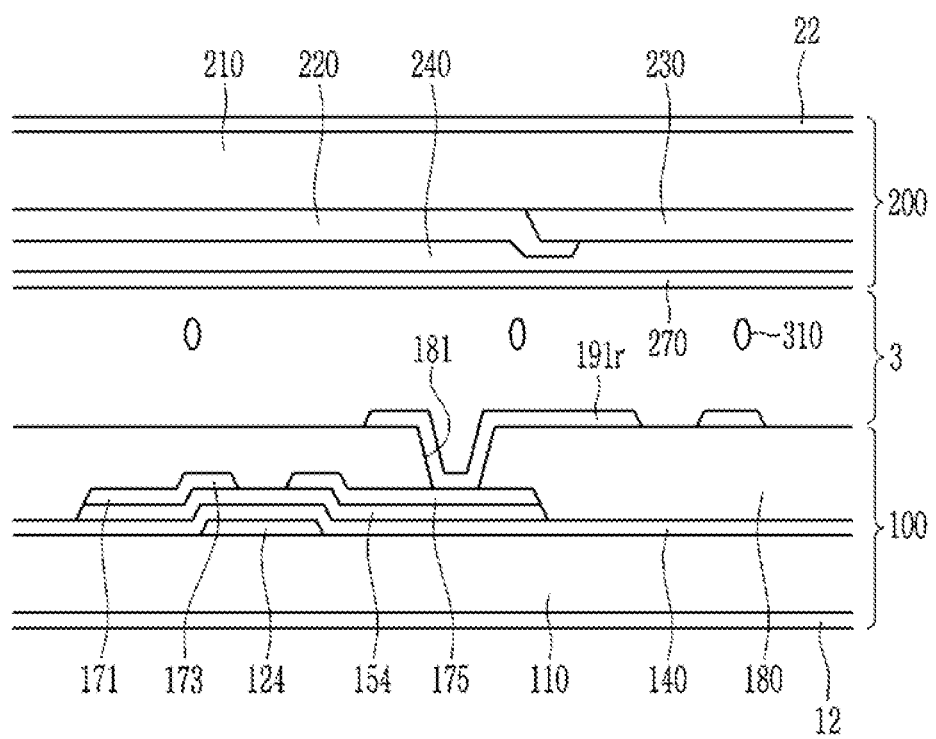
FIG. 3 is a cross-sectional view taken along a line III-Ill of FIG. 2.
Figure 4:
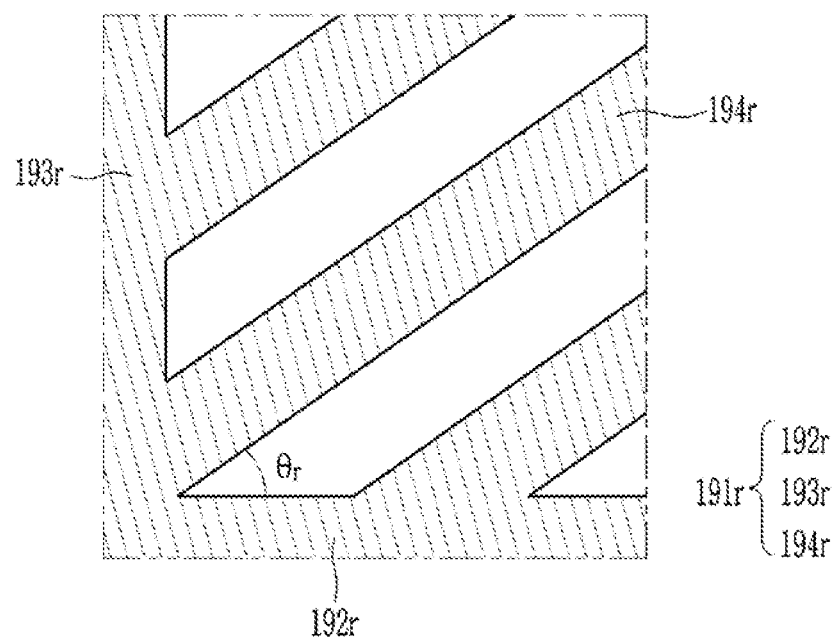
FIG. 4 is an enlarged view of a portion A of FIG. 2.
Figure 5:
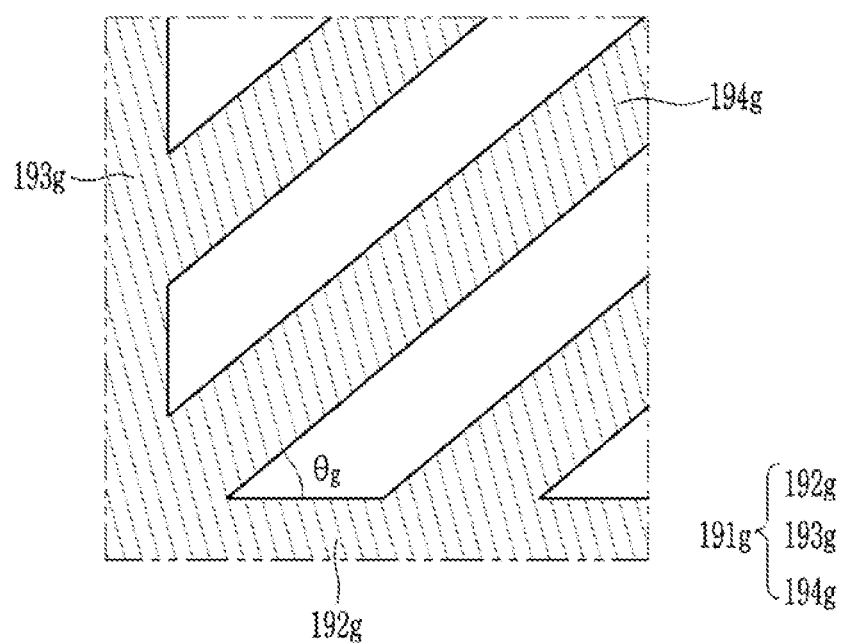
FIG. 5 is a top plan view of a part of another pixel of a display device according to an exemplary embodiment.
Figure 6:
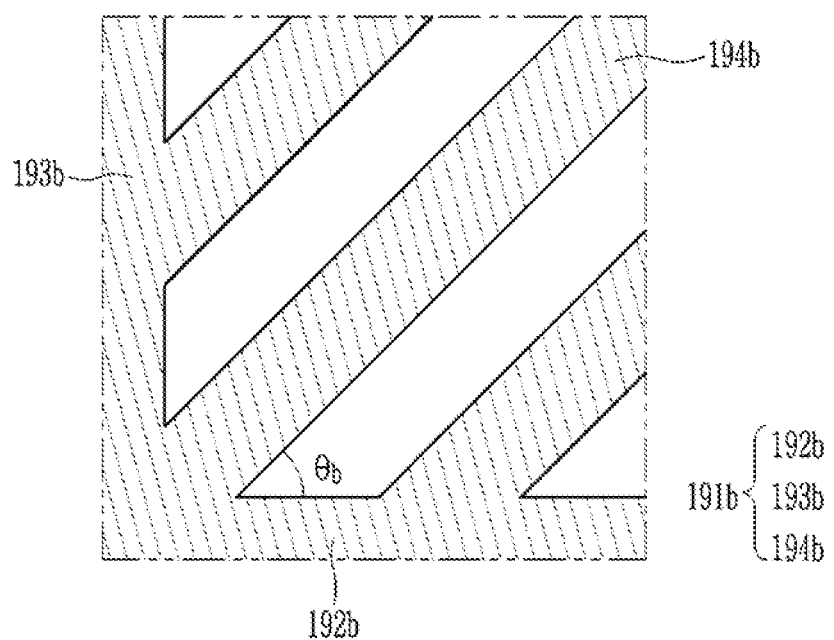
FIG. 6 is a top plan view of a part of another pixel of a display device according to an exemplary embodiment.

FIG. 1 is a schematic view of a display device according to an exemplary embodiment. FIG. 2 is a top plan view showing one pixel of a display device according to an exemplary embodiment. FIG. 3 is a cross-sectional view taken along a line III-III of FIG. 2. FIG. 4 is an enlarged view of a portion A of FIG. 2. FIG. 5 is a top plan view of a part of another pixel of a display device according to an exemplary embodiment. FIG. 6 is a top plan view of a part of another pixel of a display device according to an exemplary embodiment.

Referring to FIG. 1, a display device according to an exemplary embodiment may include a plurality of gate lines G1, . . . , Gn and a plurality of data lines D1, . . . , Dm. The plurality of gate lines G1, . . . , Gn may extend in a horizontal direction, and the plurality of data lines D1, . . . , Dm may extend in a vertical direction while crossing the plurality of gate lines G1, . . . , Gn. For example, the horizontal and vertical directions may be perpendicular to each other.

The display device according to an exemplary embodiment may include a plurality of pixels PXr, PXg, and PXb. The plurality of pixels PXr, PXg, and PXb may include a red pixel PXr, a green pixel PXg, and a blue pixel PXb. However, exemplary embodiments are not limited thereto, and other color pixels may be further included as well as the red, green, and blue pixels. For example, at least one among the red, green, and blue pixels may be omitted. For example, the plurality of pixels may further include a white pixel (e.g., a white pixel PXw, which is described in more detail below with reference to FIGS. 15 and 16).

Each of the plurality of pixels PXr, PXg, and PXb may be connected to one of the gate lines G1, . . . , Gn and one of the data lines D1, . . . , Dm. In each of the pixels PXr, PXg, and PXb, a switching element that is connected to the gate lines G1, . . . , Gn and the data lines D1, . . . , Dm may be formed. The switching element may include a three-terminal element such as a thin film transistor (TFT). A control terminal of the switching element may be connected to the gate lines G1, . . . , Gn, an input terminal of the switching element may be connected to the data lines D1, . . . , Dm, and an output terminal of the switching element may be connected to a liquid crystal capacitor.

One exemplary pixel of the display device according to an exemplary embodiment will be described in more detail below with reference to FIG. 2 to FIG. 4. FIG. 2 to FIG. 4 show a red pixel, as an example.

The display device according to an exemplary embodiment may include a lower panel 100 and an upper panel 200 facing each other (e.g., along a direction orthogonal to an upper surface of the lower panel 100), and a liquid crystal layer 3 disposed between two display panels 100 and 200.

The lower panel 100 is described in more detail below.

A gate line 121 and a gate electrode 124 protruded from the gate line 121 may be disposed on a first substrate 110.

The gate line 121 may extend in an approximately horizontal direction (e.g., along a direction parallel to an upper surface of the first substrate 110) and may transmit a gate signal. The gate electrode 124 may be protruded above the gate line 121 on a plane (e.g., when viewed from a plan view). However, exemplary embodiments are not limited thereto, and the protruded shape of the gate electrode 124 may be variously changed. Also, the gate electrode 124 need not be protruded from the gate line 121, but may be disposed on the gate line 121. For example, the gate electrode 124 may overlap the gate line 121 when viewed in a plan view.

A reference voltage line 131 and storage electrodes 135a and 135b protruded from the reference voltage line 131 may be disposed on the first substrate 110.

The reference voltage line 131 may extend in a direction substantially parallel to the gate line 121 and may be separated from the gate line 121. A predetermined voltage may be applied to the reference voltage line 131. The storage electrode 135a and 135b may include a pair of a first storage electrode 135a substantially perpendicular to the reference voltage line 131 and a second storage electrode 135b connecting a pair of first storage electrodes 135a. The reference voltage line 131 and the storage electrodes 135a and 135b may have a shape enclosing a red pixel electrode 191r that is described in more detail below.

A gate insulating layer 140 may be disposed on the gate line 121, the gate electrode 124, the reference voltage line 131, and the storage electrodes 135a and 135b. The gate insulating layer 140 may include an inorganic insulating material such as a silicon nitride (SiNx), or a silicon oxide (SiOy). The gate insulating layer 140 may have a single layer or a multilayer structure.

A semiconductor 154 may be disposed on the gate insulating layer 140. The semiconductor 154 may be disposed on the gate electrode 124. The semiconductor 154 may include amorphous silicon, polycrystalline silicon, or a metal oxide.

An ohmic contact may be disposed on the semiconductor 154. The ohmic contact may include a material such as n+ hydrogenated amorphous silicon in which an n-type impurity is doped with a high concentration, or a silicide.

A data line 171, a source electrode 173, and a drain electrode 175 may be disposed on the semiconductor 154 and the gate insulating layer 140.

The data line 171 may transmit a data signal and may extend in an approximately vertical direction (e.g., along a direction orthogonal to an upper surface of the first substrate 110), thus crossing the gate line 121 and the reference voltage line 131. The source electrode 173 may be protruded from the data line 171 above the gate electrode 124 and may be bent in a "U" shape (e.g., when viewed in a plan view). The drain electrode 175 may include one relatively wide end portion and a rod-shaped end portion. The wide end portion of the drain electrode 175 may overlap the red pixel electrode 191r. The rod-shaped end portion of the drain electrode 175 may be enclosed by a wide end portion of the source electrode 173. However, exemplary embodiments are not limited thereto, and the shape of the source electrode 173 and the drain electrode 175 may be variously changed.

The gate electrode 124, the source electrode 173, and the drain electrode 175 may form a thin film transistor Q along with the semiconductor 154. In this case, a channel of the thin film transistor Q may be formed in the semiconductor 154 between the source electrode 173 and the drain electrode 175.

A passivation layer 180 may be disposed on the data line 171, the source electrode 173, and the drain electrode 175. The passivation layer 180 may also be disposed on the semiconductor 154 that is exposed between the source electrode 173 and the drain electrode 175.

The passivation layer 180 may include the organic insulating material or the inorganic insulating material and may have a single layer or a multilayer structure.

The passivation layer 180 may include a contact hole 181 overlapping at least part of the drain electrode 175 (e.g., along the direction orthogonal to an upper surface of the first substrate 110). The contact hole 181 may expose the wide end portion of the drain electrode 175.

The red pixel electrode 191r may be formed on the passivation layer 180. The red pixel electrode 191r may include a transparent conductive material such as indium-tin oxide (ITO), or indium-zinc oxide (IZO). The red pixel electrode 191r may be connected to the drain electrode 175 through the contact hole 181. Accordingly, when the thin film transistor Q is turned on, the red pixel electrode 191r may receive a data voltage through the drain electrode 175. The overall shape of the red pixel electrode 191r may be a quadrangle (e.g., a square), and the red pixel electrode 191r may include a transverse stem portion 192r and a longitudinal stem portion 193r crossing each other and a fine branch portion 194r extending therefrom. The red pixel electrode 191r may be divided into four sub-regions by the transverse stem portion 192r and the longitudinal stem portion 193r. The fine branch portion 194r may obliquely extend from the transverse stem portion 192r and the longitudinal stem portion 193r. An angle θr between the transverse stem portion 192r and the fine branch portion 194r may be from about 35 degrees to about 55 degrees. The transverse stem portion 192r may be substantially parallel to the gate line 121. Accordingly, the angle between the gate line 121 and the fine branch portion 194r may be the same as the angle θr between the transverse stem portion 192r and the fine branch portion 194r.

In an exemplary embodiment, the red pixel electrode 191r may further include an outer stem portion enclosing the exterior of the sub-pixel.

The disposition form of the pixel, the structure of the thin film transistor, and the shape of the pixel electrode described above are one example, but exemplary embodiments are not limited thereto.

As an example, a first alignment layer may be formed on an inner surface of the lower panel 100. The first alignment layer may be disposed on the red pixel electrode 191r.

A first polarizer 12 may be formed on an outer surface of the lower panel 100, for example, under the first substrate 110. The first polarizer 12 may include an absorbing polarizer or a reflective polarizer. However, exemplary embodiments are not limited thereto, and the first polarizer 12 may be formed on the inner surface of the lower panel 100.

The upper panel 200 is described in more detail below.

A light blocking member 220 may be formed on a second substrate 210. The second substrate 210 may include a transparent glass or plastic. The light blocking member 220 may be referred to as a black matrix and may prevent light leakage. The light blocking member 220 may be formed on a boundary of each sub-pixel such as the gate line 121, the data line 171, and the thin film transistor Q. In an exemplary embodiment, the light blocking member 220 may be formed in the upper panel 200, however exemplary embodiments are not limited thereto. The light blocking member 220 may be formed in the lower panel 100.

A plurality of color filters 230 may be formed on the second substrate 210. The color filters 230 may be positioned in a region enclosed by the light blocking member 220. The color filters 230 may extend in the vertical direction. Each color filter 230 may display one among primary colors such as three primary colors of red, green, and blue. An example of the primary colors may include the three primary colors such as red, green, and blue, or yellow, cyan, or magenta. For example, a red filter may be disposed in the red pixel PXr, a green filter may be disposed in the green pixel PXg, and a blue filter may be disposed in the blue pixel PXb. The color filter may further include a color filter displaying a mixed color or white as well as the primary colors.

In an exemplary embodiment, the color filter 230 may be formed in the upper panel 200, however exemplary embodiments are not limited thereto. The color filter 230 may be formed in the lower panel 100.

An overcoat 240 may be formed on the color filter 230 and the light blocking member 220. The overcoat 240 may include an organic insulating material, may prevent exposure of the color filter 230 and may provide a relatively smooth surface. However, exemplary embodiments are not limited thereto, and the overcoat 240 may be omitted.

A common electrode 270 may be formed on the overcoat 240. The common electrode 270 may include a transparent conductive material such as indium-tin oxide (ITO), or indium-zinc oxide (IZO). A common voltage may be applied to the common electrode 270, and the common voltage may be a substantially constant voltage.

A second alignment layer may be formed on the inner surface of the upper panel 200. The second alignment layer may be disposed on the common electrode 270.

A second polarizer 22 may be formed on the outer surface of the upper panel 200, for example, on the second substrate 210. The second polarizer 22 may include the absorption polarizer or the reflective polarizer. However, exemplary embodiments are not limited thereto, and the second polarizer 22 may be formed on the inner surface of the upper panel 200.

The liquid crystal layer 3 may include a plurality of liquid crystal molecules 310 having negative dielectric anisotropy, and the liquid crystal molecules 310 of the liquid crystal layer 3 may be arranged such that long axis of the liquid crystal molecules 310 may be aligned to be perpendicular to the surface of the display panels 100 and 200 in the absence of an electric field (e.g., along a direction orthogonal to an upper surface of the lower panel 100).

The red pixel electrode 191r to which the data voltage is applied may generate the electric field along with the common electrode 270, thus determining the direction of the liquid crystal molecule 310 of the liquid crystal layer 3 disposed between the two electrodes 191r and 270. Depending on the directions of the liquid crystal molecules 310 determined as such, luminance of the light passing through liquid crystal layer 3 can be varied.

Other pixels of the display device according to an exemplary embodiment will be described in more detail below with reference to FIG. 5 and FIG. 6. FIG. 5 is an enlarged view of part of the green pixel, and FIG. 6 is an enlarged view of part of the blue pixel.

The thin film transistor may be formed in the green pixel PXg and the blue pixel PXb, like the red pixel PXr.

As above-described, the red pixel electrode 191r and a red filter may be formed in the red pixel PXr. Likewise, a green pixel electrode 191g and a green filter are formed in the green pixel PXg, and a blue pixel electrode 191b and a blue filter are formed in the blue pixel PXb.

The green pixel electrode 191g may include a transparent conductive material like the red pixel electrode 191r. The green pixel electrode 191g may have a quadrangular shape (e.g., a square) overall and may include a transverse stem portion 192g and a longitudinal stem portion 193g crossing each other, and a fine branch portion 194g extending therefrom. The fine branch portion 194g may obliquely extend from the transverse stem portion 192g and the longitudinal stem portion 193g. An angle θg between the transverse stem portion 192g and the fine branch portion 194g may be from about 35 degrees to about 55 degrees. The transverse stem portion 192g may be substantially parallel to the gate line 121. Accordingly, the angle between the gate line 121 and the fine branch portion 194g may be the same as the angle θg between the transverse stem portion 192g and the fine branch portion 194g.

The blue pixel electrode 191b may include a transparent conductive material like the red pixel electrode 191r. The blue pixel electrode 191b may have a quadrangular shape (e.g., a square) overall and may include a transverse stem portion 192b and a longitudinal stem portion 193b crossing each other, and a fine branch portion 194b extending therefrom. The fine branch portion 194b may obliquely extend from the transverse stem portion 192b and the longitudinal stem portion 193b. The angle θb between the transverse stem portion 192b and the fine branch portion 194b may be from about 35 degrees to about 55 degrees. The transverse stem portion 192b may be substantially parallel to the gate line 121. Accordingly, the angle between the gate line 121 and the fine branch portion 194b may be the same as the angle θb between the transverse stem portion 192b and the fine branch portion 194b.

The transmittance of each of the pixels PXr, PXg, and PXb may be determined depending on Equation 1 below. The wavelengths of light passing through the red pixel PXr, the green pixel PXg, and the blue pixel PXb are different from each other. Accordingly, when setting each of the angles θr, θg, and θb between the transverse stem portions 192r, 192g, and 192b and the fine branch portions 194r, 194g, and 194b of each of the pixels PXr, PXg, and PXb to be the same, the transmittances of each of the pixels PXr, PXg, and PXb are different from each other.

$$T = \frac{1}{2}\sin^2(2\phi)\sin^2\left(\frac{\pi(n_e - n_o)d}{\lambda}\right) = \frac{1}{2}\sin^2(2\phi)\sin^2\left(\frac{\Gamma}{2}\right)$$ [Equation 1]

$$\Gamma = \frac{2\pi(n_e - n_o)d}{\lambda}$$

(T: transmittance, $n_e$: vertical direction refractive index, $n_o$: horizontal direction refractive index, d: thickness, λ: wavelength, Γ: phase retardation)

In the display device according to an exemplary embodiment, by differentiating each of the angles θr, θg, and θb between the transverse stem portions 192r, 192g, and 192b and the fine branch portions 194r, 194g, and 194b of each of the pixels PXr, PXg, and PXb, the transmittance for each of the pixels PXr, PXg, and PXb may be increased.

The angles θr, θg, and θb between the transverse stem portions 192r, 192g, and 192b and the fine branch portions 194r, 194g, and 194b of each of the pixels PXr, PXg, and PXb will be described in more detail below with reference to Table 1.

TABLE 1

| | Optimization angle difference considering only wavelength | Optimization angle difference considering luminance ratio | |
|---|---|---|---|
| | | absorption polarizer | reflective polarizer |
| Angle difference of red pixel to green pixel | −4 | −3.17276 | −1.04076 |
| Angle difference of blue pixel to green pixel | 6 | 4.75914 | 1.561139 |
| Angle difference of green pixel to blue pixel | −6 | −0.73829 | −4.55199 |
| Angle difference of red pixel to blue pixel | −10 | −1.23049 | −7.58664 |
| Angle difference of green pixel to red pixel | 4 | 0.82724 | 2.959241 |
| angle difference of blue pixel to red pixel | 10 | 6.5013 | 4.749238 |

If the wavelength of each of the pixels PXr, PXg, and PXb is considered, when the angle θr between the transverse stem portion 192r and the fine branch portion 194r of the red pixel PXr is lower than the angle θg between the transverse stem portion 192g and the fine branch portion 194g of the green pixel PXg by about 4 degrees, increased transmittance may occur. Also, when the angle θb between the transverse stem portion 192b and the fine branch portion 194b of the blue pixel PXb is higher than the angle θg between the transverse stem portion 192g and the fine branch portion 194g of the green pixel PXg by about 6 degrees, increased transmittance may occur. For example, the angle θg between the transverse stem portion 192g and the fine branch portion 194g of the green pixel PXg may be about 45 degrees, the angle θr between the transverse stem portion 192r and the fine branch portion 194r of the red pixel PXr may be from about 41 degrees to about 45 degrees, and the angle θb between the transverse stem portion 192b and the fine branch portion 194b of the blue pixel PXb may be from about 45 degrees to about 51 degrees.

This value range is preferable when the luminance ratios of the red pixel PXr, the green pixel PXg, and the blue pixel PXb are the same. However, in actuality, the luminance ratios of the red pixel PXr, the green pixel PXg, and the blue pixel PXb are not the same. For example, when the first and second polarizers 12 and 22 are the absorption polarizer, the luminance ratio of the red pixel PXr, the green pixel PXg, and the blue pixel PXb is 0.186:0.713:0.1. When the first and second polarizers 12 and 22 are formed as the reflective polarizer, the luminance ratio of the red pixel PXr, the green pixel PXg, and the blue pixel PXb is 0.406:0.143:0.449.

Accordingly, if the wavelength and the luminance ratio of the pixels PXr, PXg, and PXb are considered together, when the first and second polarizers 12 and 22 are the absorption polarizer and the angle θg between the transverse stem portion 192g and the fine branch portion 194g of the green pixel PXg is about 45 degrees, the increased transmittance may appear when the angle θr between the transverse stem portion 192r and the fine branch portion 194r of the red pixel PXr is lower than the angle θg between the transverse stem portion 192g and the fine branch portion 194g of the green pixel PXg by about 3.17 degrees. Also, when the angle θb between the transverse stem portion 192b and the fine branch portion 194b of the blue pixel PXb is higher than the angle θg between the transverse stem portion 192g and the fine branch portion 194g of the green pixel PXg by about 4.76 degrees, the increased transmittance may appear. Accordingly, the angle θg between the transverse stem portion 192g and the fine branch portion 194g of the green pixel PXg may be about 45 degrees, the angle θr between the transverse stem portion 192r and the fine branch portion 194r of the red pixel PXr may be from about 41.83 degrees to about 45 degrees, and the angle θb between the transverse stem portion 192b and the fine branch portion 194b of the blue pixel PXb may be from about 45 degrees to about 49.75 degrees.

When the first and second polarizers 12 and 22 are the absorption polarizer and the angle θb between the transverse stem portion 192b and the fine branch portion 194b of the blue pixel PXb is about 45 degrees, the increased transmittance may appear when the angle θg between the transverse stem portion 192g and the fine branch portion 194g of the green pixel PXg is lower than the angle θb between the transverse stem portion 192b and the fine branch portion 194b of the blue pixel PXb by about 0.74 degrees. Also, when the angle θr between the transverse stem portion 192r and the fine branch portion 194r of the red pixel PXr is lower than the angle θb between the transverse stem portion 192b and the fine branch portion 194b of the blue pixel PXb by about 1.23 degrees, the increased transmittance may appear. Accordingly, it is preferable that the angle θb between the transverse stem portion 192b and the fine branch portion 194b of the blue pixel PXb is about 45 degrees, the angle θg between the transverse stem portion 192g and the fine branch portion 194g of the green pixel PXg is from about 44.27 degrees to about 45 degrees, and the angle θr between the transverse stem portion 192r and the fine branch portion 194r of the red pixel PXr is from about 43.77 degrees to about 45 degrees.

When the first and second polarizers 12 and 22 are the absorption polarizer and the angle θr between the transverse stem portion 192r and the fine branch portion 194r of the red pixel PXr is about 45 degrees, the increased transmittance may appear when the angle θg between the transverse stem portion 192g and the fine branch portion 194g of the green pixel PXg is higher than the angle θr between the transverse stem portion 192r and the fine branch portion 194r of the red pixel PXr by about 0.82 degrees. Also, when the angle θb between the transverse stem portion 192b and the fine branch portion 194b of the blue pixel PXb is higher than the angle θr between the transverse stem portion 192r and the fine branch portion 194r of the red pixel PXr by about 6.50 degrees, the increased transmittance may appear. Accordingly, it is preferable that the angle θr between the transverse stem portion 192r and the fine branch portion 194r of the red pixel PXr is about 45 degrees, the angle θg between the transverse stem portion 192g and the fine branch portion 194g of the green pixel PXg is from about 45 degrees to about 45.82 degrees, and the angle θb between the transverse stem portion 192b and the fine branch portion 194b of the blue pixel PXb is from about 45 degrees to about 51.5 degrees.

When the first and second polarizers 12 and 22 are the reflective polarizer and the angle θg between the transverse stem portion 192g and the fine branch portion 194g of the green pixel PXg is about 45 degrees, the increased transmittance may appear when the angle θr between the transverse stem portion 192r and the fine branch portion 194r of the red pixel PXr is lower than the angle θg between the transverse stem portion 192g and the fine branch portion 194g of the green pixel PXg by about 1.04 degrees. Also, when the angle θb between the transverse stem portion 192b and the fine branch portion 194b of the blue pixel PXb is higher than the angle θg between the transverse stem portion 192g and the fine branch portion 194g of the green pixel PXg by about 1.56 degrees, the increased transmittance may appear. Accordingly, the angle θg between the transverse stem portion 192g and the fine branch portion 194g of the green pixel PXg may be about 45 degrees, the angle θr between the transverse stem portion 192r and the fine branch portion 194r of the red pixel PXr may be from about 43.96 degrees to about 45 degrees, and the angle θb between the transverse stem portion 192b and the fine branch portion 194b of the blue pixel PXb may be from about 45 degrees to about 46.56 degrees.

When the first and second polarizers 12 and 22 are the reflective polarizer and the angle θb between the transverse stem portion 192b and the fine branch portion 194b of the blue pixel PXb is about 45 degrees, the increased transmittance may appear when the angle θg between the transverse stem portion 192g and the fine branch portion 194g of the green pixel PXg is lower than the angle θb between the transverse stem portion 192b and the fine branch portion 194b of the blue pixel PXb by about 4.55 degrees. Also, when the angle θr between the transverse stem portion 192r and the fine branch portion 194r of the red pixel PXr is lower than the angle θb between the transverse stem portion 192b and the fine branch portion 194b of the blue pixel PXb by about 7.59 degrees, the increased transmittance may appear. Accordingly, it is preferable that the angle θb between the transverse stem portion 192b and the fine branch portion 194b of the blue pixel PXb is about 45 degrees, the angle θg between the transverse stem portion 192g and the fine branch portion 194g of the green pixel PXg is from about 40.45 degrees to about 45 degrees, and the angle θr between the transverse stem portion 192r and the fine branch portion 194r of the red pixel PXr is from about 37.41 degrees to about 45 degrees.

When the first and second polarizers 12 and 22 are the reflective polarizer and the angle θr between the transverse stem portion 192r and the fine branch portion 194r of the red pixel PXr is about 45 degrees, the increased transmittance may appear when the angle θg between the transverse stem portion 192g and the fine branch portion 194g of the green pixel PXg is higher than the angle θr between the transverse stem portion 192r and the fine branch portion 194r of the red pixel PXr by about 2.96 degrees. Also, when the angle θb between the transverse stem portion 192b and the fine branch portion 194b of the blue pixel PXb is higher than the angle θr between the transverse stem portion 192r and the fine branch portion 194r of the red pixel PXr by about 4.75 degrees, the increased transmittance may appear. Accordingly, it is preferable that the angle θr between the transverse stem portion 192r and the fine branch portion 194r of the red pixel PXr is about 45 degrees, the angle θg between the transverse stem portion 192g and the fine branch portion 194g of the green pixel PXg is from about 45 degrees to about 47.96 degrees, and the angle θb between the transverse stem portion 192b and the fine branch portion 194b of the blue pixel PXb is from about 45 degrees to about 49.75 degrees.

A display device according to an exemplary embodiment will be described in more detail below with reference to FIG. 7 to FIG. 14.

Figure 7:
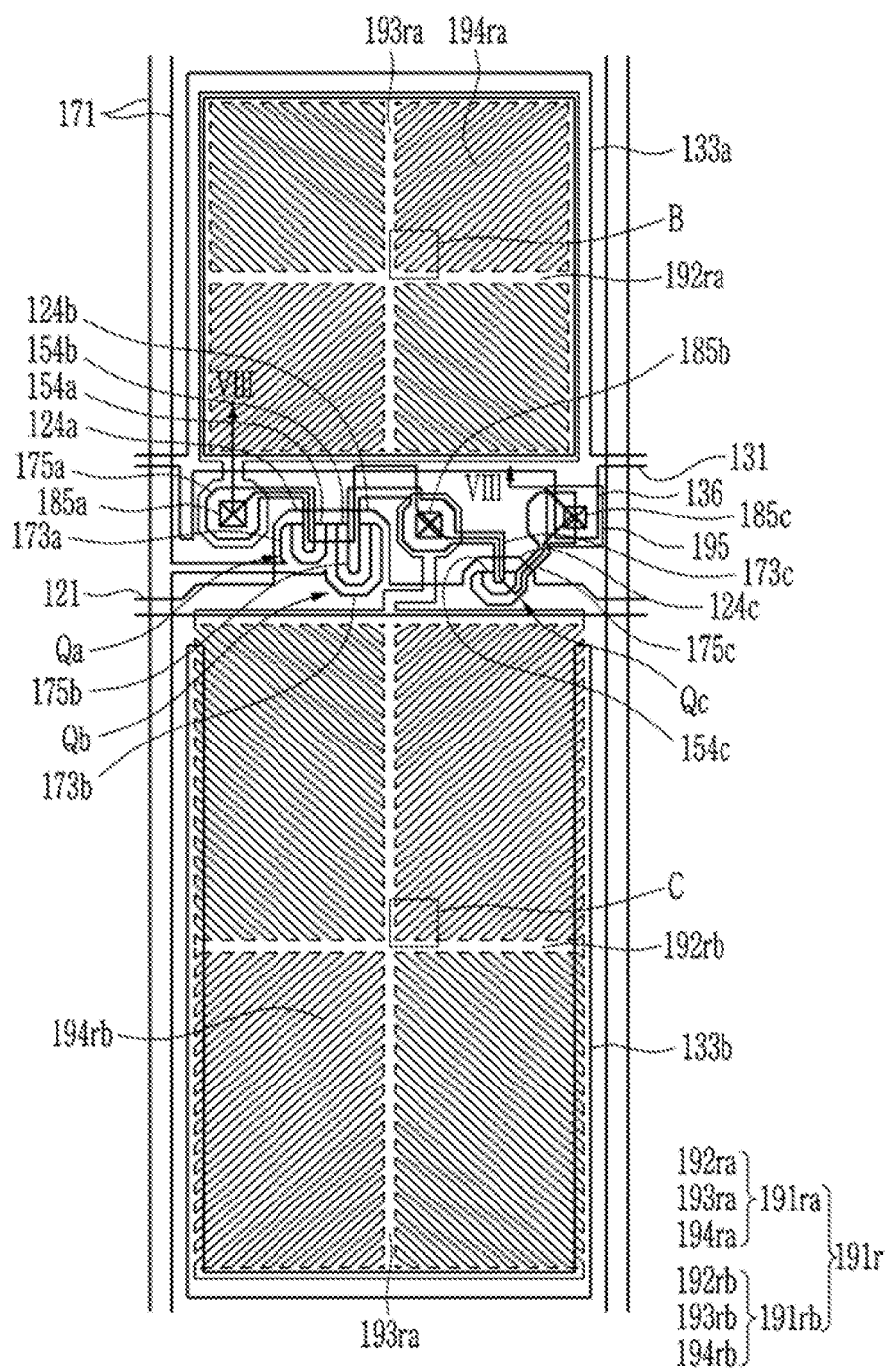
FIG. 7 is a top plan view of one pixel of a display device according to an exemplary embodiment.
Figure 8:
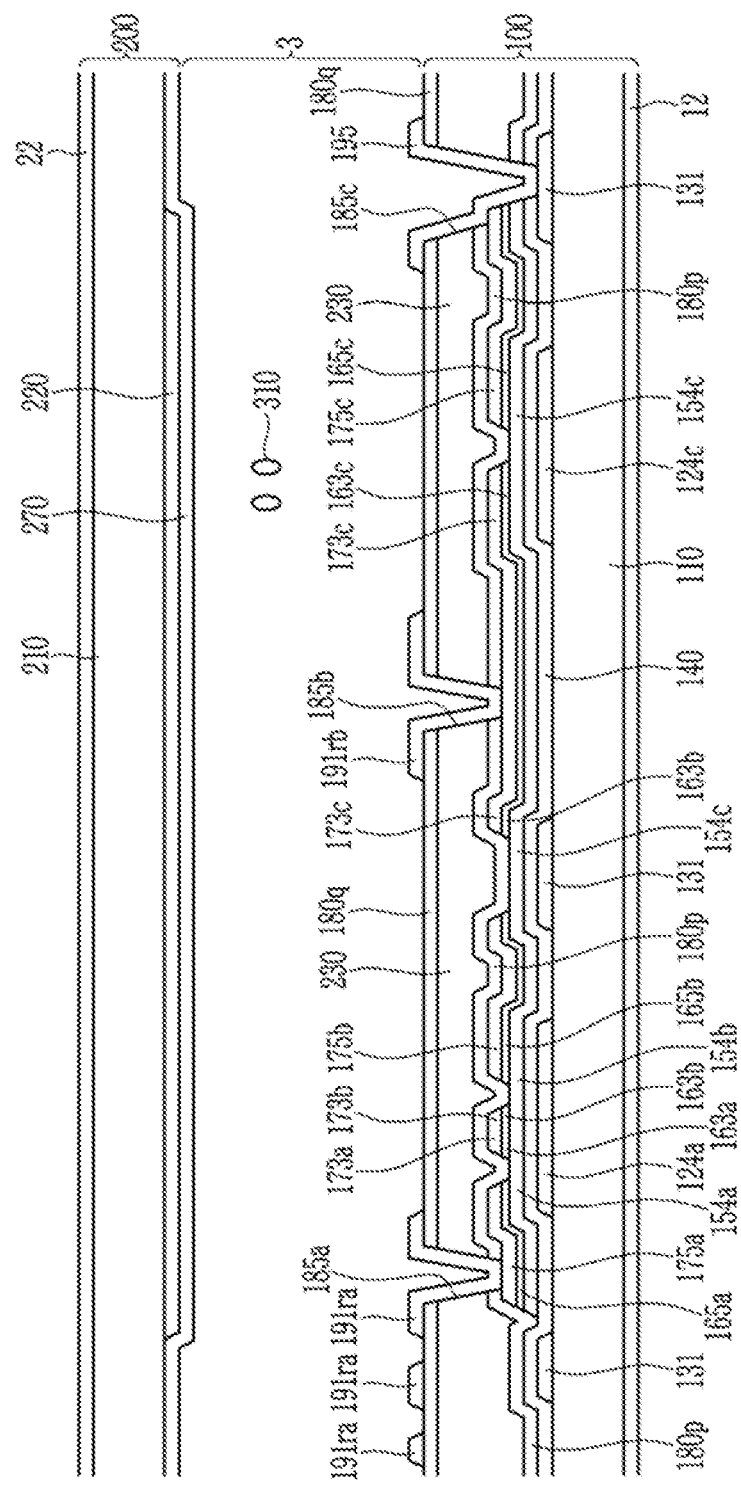
FIG. 8 is a cross-sectional view taken along a line VIII-VIII of FIG. 7.
Figure 9:
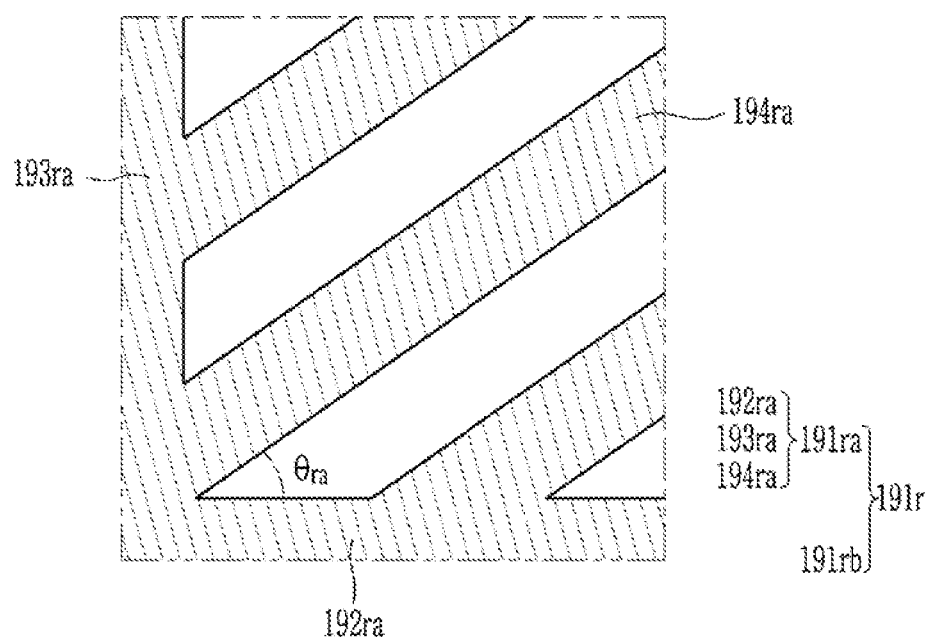
FIG. 9 is an enlarged view of a portion B of FIG. 7.
Figure 10:
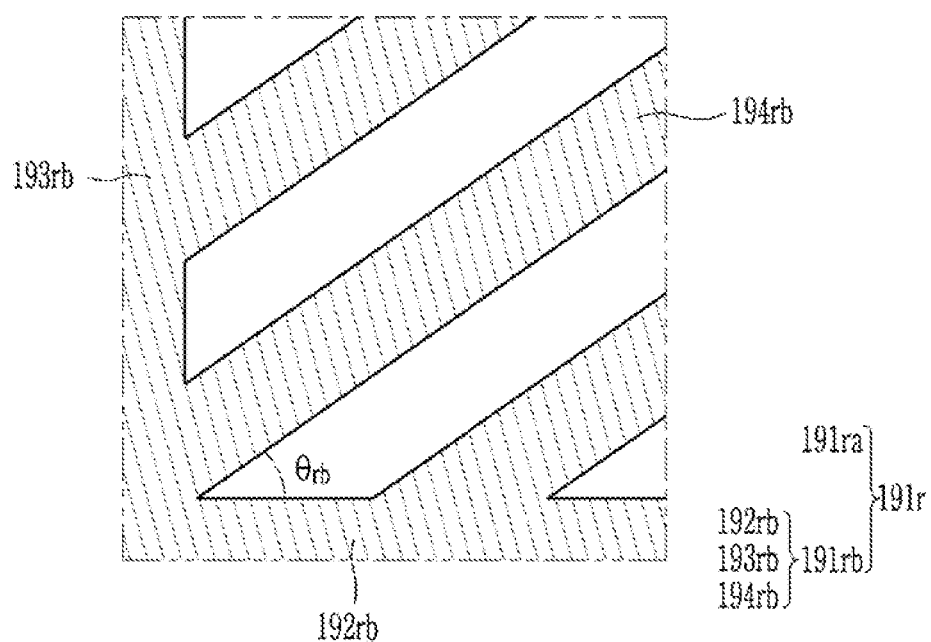
FIG. 10 is an enlarged view of a portion C of FIG. 7.
Figure 11:
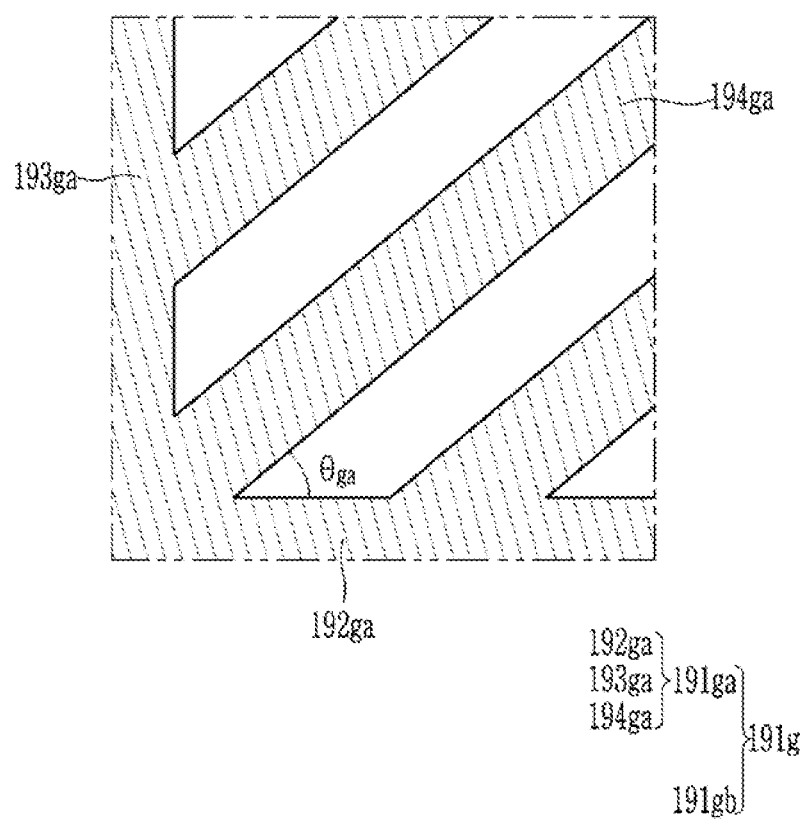
FIG. 11 is a top plan view of a part of a first sub-pixel electrode of another pixel of a display device according to an exemplary embodiment.
Figure 12:
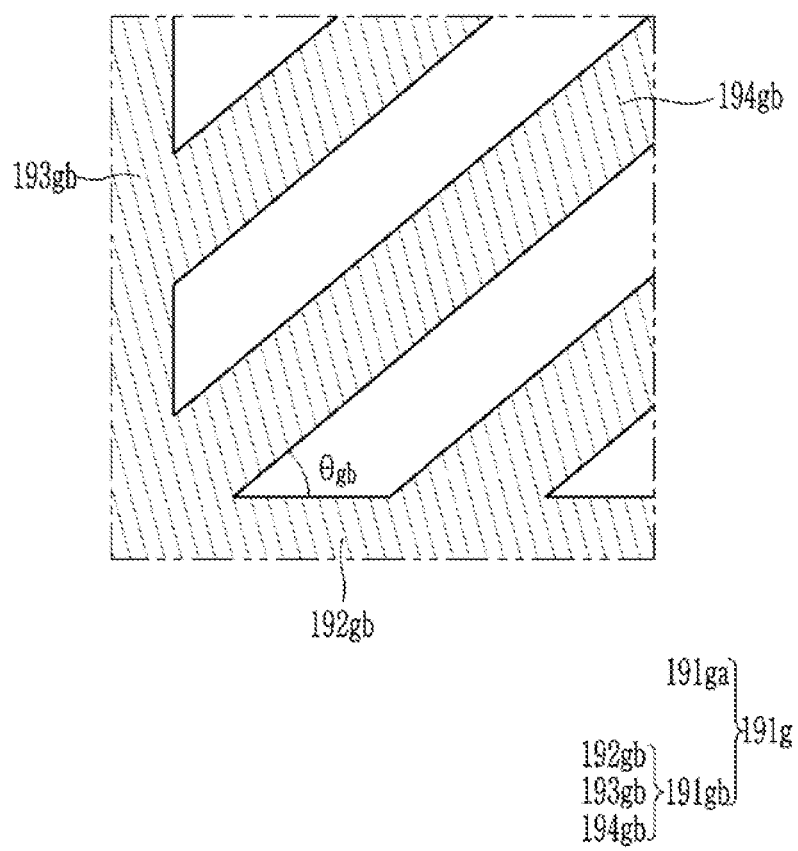
FIG. 12 is a top plan view of a part of a second sub-pixel electrode of another pixel of a display device according to an exemplary embodiment.
Figure 13:
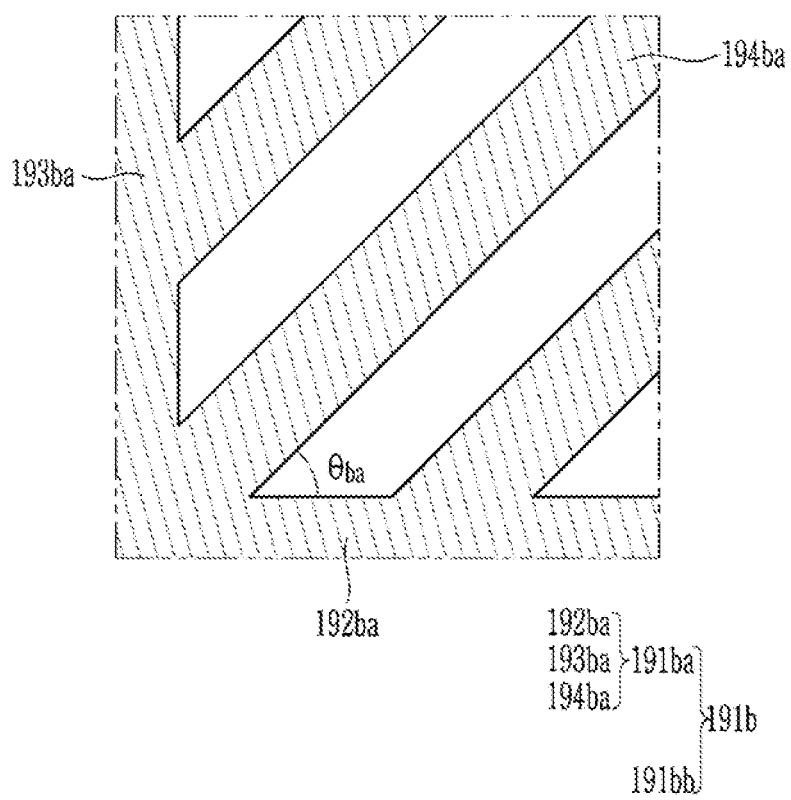
FIG. 13 is a top plan view of a part of a first sub-pixel electrode of another pixel of a display device according to an exemplary embodiment.
Figure 14:
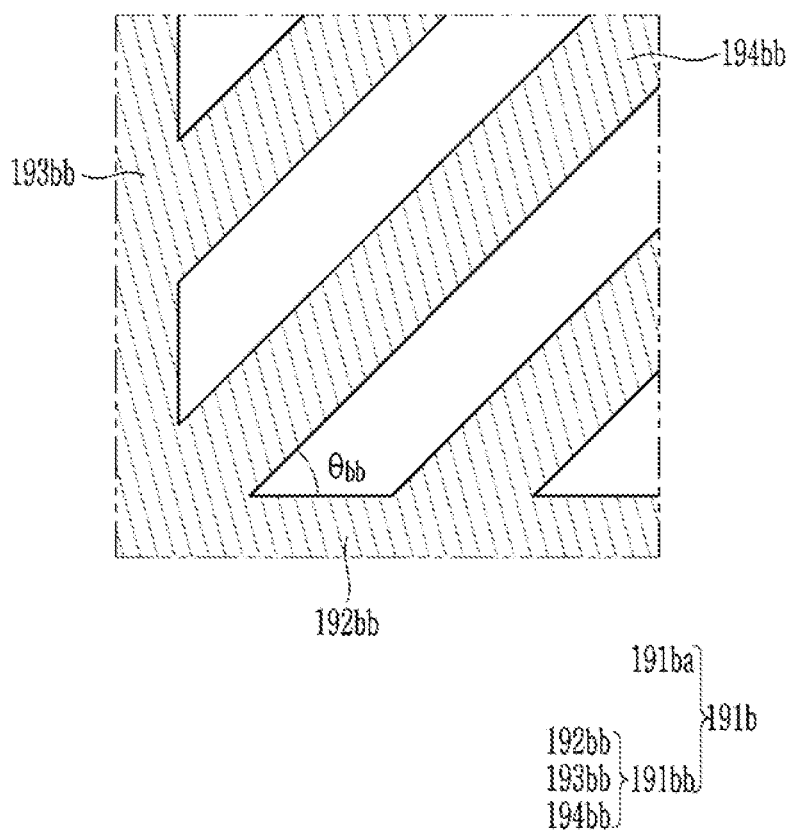
FIG. 14 is a top plan view of a part of a second sub-pixel electrode of another pixel of a display device according to an exemplary embodiment.

FIG. 7 is a top plan view of one pixel of a display device according to an exemplary embodiment. FIG. 8 is a cross-sectional view taken along a line VIII-VIII of FIG. 7. FIG. 9 is an enlarged view of a portion B of FIG. 7. FIG. 10 is an enlarged view of a portion C of FIG. 7. FIG. 11 is a top plan view of a part of a first sub-pixel electrode of another pixel of a display device according to an exemplary embodiment. FIG. 12 is a top plan view of a part of a second sub-pixel electrode of another pixel of a display device according to an exemplary embodiment. FIG. 13 is a top plan view of a part of a first sub-pixel electrode of another pixel of a display device according to an exemplary embodiment. FIG. 14 is a top plan view of a part of a second sub-pixel electrode of another pixel of a display device according to an exemplary embodiment.

One pixel of a display device according to an exemplary embodiment will be described in more detail below, as an example, with reference to FIG. 7 to FIG. 10. FIG. 7 to FIG. 10 illustrate a red pixel, as an example.

The display device according to an exemplary embodiment may include the lower panel 100 and the upper panel 200 facing each other, and the liquid crystal layer 3 disposed between the two display panels 100 and 200.

The lower panel 100 is described in more detail below.

The gate line 121 and the reference voltage line 131 may be formed on the first substrate 110. The first substrate 110 may include transparent glass or plastic.

The gate line 121 may mainly extend in the horizontal direction and may transmit a gate signal. The gate line 121 may include a first gate electrode 124a, a second gate electrode 124b, and a third gate electrode 124c.

The reference voltage line 131 may mainly extend in the horizontal direction, and may transmit a predetermined voltage such as a reference voltage. The reference voltage line 131 may include a first storage electrode 133a enclosing a first sub-pixel electrode 191ra and a second storage electrode 133b enclosing a second sub-pixel electrode 191rb. The first sub-pixel electrode 191ra and the second sub-pixel electrode 191rb will be described in more detail below. A horizontal portion of the first reference electrode 133a may be formed of a horizontal portion of the second reference electrode 133b of a pixel with an integrated wire. The reference voltage line 131 may include an extension portion 136 that is protruded toward the gate line 121. The extension portion 136 may be connected to a third drain electrode 175c. The third drain electrode 175c will be described in more detail below.

The gate insulating layer 140 may be formed on the gate line 121, the reference voltage line 131, and the first and second storage electrodes 133a and 133b.

A first semiconductor 154a, a second semiconductor 154b, and a third semiconductor 154c that may each include an amorphous silicon or a crystalline silicon may be formed on the gate insulating layer 140.

A plurality of ohmic contacts 163a, 163b, 163c, 165a, 165b, or 165b may be formed on the first semiconductor 154a, the second semiconductor 154b, and the third semiconductor 154c. When the semiconductors 154a, 154b, and 154c are oxide semiconductors, the ohmic contacts 163a, 163b, 163c, 165a, 165b, and 165b may be omitted.

A data conductor (171, 173a, 173b 173c, 175a, 175b, or 175c) including data line 171, a first source electrode 173a, a second source electrode 173b, a first drain electrode 175a, a second drain electrode 175b, a third source electrode 173c, and a third drain electrode 175c may be formed on the ohmic contacts 163a, 163b, 163c, 165a, 165b, and 165b and the gate insulating layer 140. The third drain electrode 175c may partially overlap the extension portion 136 of the reference voltage line 131 (e.g., along the direction orthogonal to an upper surface of the first substrate 110).

The second drain electrode 175b may be connected to the third source electrode 173c.

The first gate electrode 124a, the first source electrode 173a, and the first drain electrode 175a may form a first thin film transistor Qa along with the first semiconductor 154a, and the channel of the first thin film transistor Qa may be formed in the first semiconductor 154a between the first source electrode 173a and the first drain electrode 175a.

Similarly, the second gate electrode 124b, the second source electrode 173b, and the second drain electrode 175b may form a second thin film transistor Qb along with the second semiconductor 154b. The channel of the second thin film transistor Qb may be formed in the second semiconductor 154b between the second source electrode 173b and the second drain electrode 175b. The third gate electrode 124c, the third source electrode 173c, and the third drain electrode 175c may form a third thin film transistor Qc along with the third semiconductor 154c. The channel of the third thin film transistor Qc may be formed in the third semiconductor 154c between the third source electrode 173c and the third drain electrode 175c.

A first passivation layer 180p that may include an inorganic insulator such as a silicon nitride (SiNx) or a silicon oxide (SiOy) may be formed on the data conductor (171, 173a, 173b 173c, 175a, 175b, and 175c) and the exposed semiconductors 154a, 154b, and 154c.

A color filter 230 may be disposed on the first passivation layer 180p. The color filter 230 may extend to be elongated along the pixel electrode column. Each color filter 230 may display one among three primary colors such as the primary colors red, green, or blue. However, the color filters 230 are not limited to three primary colors such as red, green, and blue, and may display one of cyan, magenta, yellow, or white-based colors. For example, the red filter may be disposed in the red pixel, the green filter may be disposed in the green pixel, and the blue filter may be disposed in the blue pixel. The color filter 230 may further include a color filter displaying a mixed color or white as well as the primary colors.

A second passivation layer 180q may be disposed on the color filter 230. The second passivation layer 180q may prevent peeling of the color filter 230 and may reduce or eliminate contamination of the liquid crystal layer 3 by an organic material of the solvent that inflows from the color filter 230, thus reducing or eliminating defects such as afterimages that may occur when an image is driven.

In an exemplary embodiment, the color filter 230 may be formed in the lower panel 100, however, exemplary embodiments are not limited thereto. The color filter 230 may be formed in the upper panel 200.

The first passivation layer 180p, the color filter 230, and the second passivation layer 180q may include a first contact hole 185a exposing the first drain electrode 175a and a second contact hole 185b exposing the second drain electrode 175b. The gate insulating layer 140, the first passivation layer 180p, the color filter 230, and the second passivation layer 180q may include a third contact hole 185c exposing the extension portion 136 of the reference voltage line 131 and the third drain electrode 175c.

The red pixel electrode 191r including the first sub-pixel electrode 191ra and the second sub-pixel electrode 191rb may be formed on the second passivation layer 180q. A connection electrode 195 may be formed on the same layer as and may include a same material as the red pixel electrode 191r. The red pixel electrode 191r and the connection electrode 195 may each include a transparent conductive material such as ITO, or IZO.

The first sub-pixel electrode 191ra and the second sub-pixel electrode 191rb may be adjacent in the column direction (e.g., along the direction orthogonal to an upper surface of the first substrate 110). The first sub-pixel electrode 191ra and the second sub-pixel electrode 191rb may each have a quadrangular shape (e.g., a square) and may each include a cross-shaped stem portion including transverse stem portions 192ra and 192rb and longitudinal stem portions 193ra and 193rb crossing the transverse stem portions 192ra and 192rb.

The red pixel electrode 191r may be divided into four sub-regions by the transverse stem portions 192ra and 192rb and the longitudinal stem portions 193ra and 193rb, and each sub-region may include a plurality of fine branch portions 194ra and 194rb.

The fine branch portions 194ra and 194rb of the first sub-pixel electrode 191ra and the second sub-pixel electrode 191rb may obliquely extend from the transverse stem portions 192ra and 192rb and the longitudinal stem portions 193ra and 193rb. In this case, among four sub-regions, the fine branch portions 194ra and 194rb may obliquely extend from the transverse stem portions 192ra and 192rb or the longitudinal stem portions 193ra and 193rb in a left-upper direction in one sub-region, and the fine branch portions 194ra and 194rb may obliquely extend from the transverse stem portions 192ra and 192rb or the longitudinal stem portions 193ra and 193rb in a right-upper direction in another sub-region. The fine branch portions 194ra and 194rb may obliquely extend from the transverse stem portions 192ra and 192rb or the longitudinal stem portions 193ra and 193rb in a left-lower direction in another sub-region, and the fine branch portions 194ra and 194rb may obliquely extend from the transverse stem portions 192ra and 192rb or the longitudinal stem portions 193ra and 193rb in a right-lower direction in another sub-region.

The angles θra and θrb between the transverse stem portions 192ra and 192rb and the fine branch portions 194ra and 194rb may be from about 35 degrees to about 55 degrees. The transverse stem portions 192ra and 192rb may extend to be substantially parallel to the gate line 121. Accordingly, the angle between the gate line 121 and the fine branch portions 194ra and 194rb may be the same as the angles θra and θrb between the transverse stem portions 192ra and 192rb and the fine branch portions 194ra and 194rb.

The connection electrode 195 may overlap the extension portion 136 of the reference voltage line 131 and may overlap the third drain electrode 175c (e.g., along the direction orthogonal to an upper surface of the first substrate 110). The connection electrode 195 may be physically and electrically connected to the extension portion 136 of the reference voltage line 131 through the third contact hole 185c, and may be physically and electrically connected to the third drain electrode 175c.

The first sub-pixel electrode 191ra and the second sub-pixel electrode 191rb may be physically and electrically connected to the first drain electrode 175a and the second drain electrode 175b through the first contact hole 185a and the second contact hole 185b, respectively, thus receiving the data voltage from the first drain electrode 175a and the second drain electrode 175b.

The area of the second sub-pixel electrode 191rb may be approximately one to two times that of the first sub-pixel electrode 191ra.

The arrangement form of the pixel, the structure of the thin film transistor, and the shape of the pixel electrode described above are one example, but exemplary embodiments are not limited thereto.

The first alignment layer may be formed on the inner surface of the lower panel 100. The first alignment layer may be disposed on the red pixel electrode 191r.

The first polarizer 12 may be formed at the outer surface of the lower panel 100, for example, under the first substrate 110. The first polarizer 12 may be the absorption polarizer or the reflective polarizer. However, exemplary embodiments are not limited thereto, and the first polarizer 12 may be formed at the inner surface of the lower panel 100.

The upper panel 200 is described in more detail below.

The light blocking member 220 and the common electrode 270 may be formed on the second substrate 210. The second substrate 210 may include transparent glass or plastic.

The light blocking member 220 may overlap the gate line 121, the data line 171, and the first to third thin film transistors Qa, Qb, and Qc (e.g., along the direction orthogonal to an upper surface of the first substrate 110). The light blocking member 220 may be referred to as a black matrix and may prevent light leakage. In an exemplary embodiment, the light blocking member 220 may be formed in the upper panel 200, however exemplary embodiments are not limited thereto. The light blocking member 220 may be formed in the lower panel 100.

The common electrode 270 may be entirely formed on the second substrate 210, and the predetermined voltage may be applied to the common electrode 270.

The second alignment layer may be formed at the inner surface of the upper panel 200. The second alignment layer may be disposed on the common electrode 270.

The second polarizer 22 may be formed at the outer surface of the upper panel 200, for example, on the second substrate 210. The second polarizer 22 may be the absorption polarizer or the reflective polarizer. However, exemplary embodiments are not limited thereto, and the second polarizer 22 may be formed at the inner surface of the upper panel 200.

The liquid crystal layer 3 may have a negative dielectric anisotropy, and liquid crystal molecules 310 of the liquid crystal layer 3 may be aligned to have a major axis perpendicular to the surfaces of the two display panels 100 and 200 (e.g., along the direction orthogonal to an upper surface of the first substrate 110) without an electric field.

At least one of the liquid crystal layer 3 and the alignment layer may include a photoreactive material, for example, a reactive mesogen.

Other pixels of the display device according to an exemplary embodiment are described in more detail below with reference to FIG. 11 to FIG. 14. FIG. 11 shows the enlarged part of the first sub-pixel electrode of the green pixel, and FIG. 12 shows the enlarged part of the second sub-pixel electrode of the green pixel. FIG. 13 shows the enlarged part of the first sub-pixel electrode of the blue pixel, and FIG. 14 shows the enlarged part of the second sub-pixel electrode of the blue pixel.

The thin film transistor may be formed in the green pixel PXg and the blue pixel PXb, like the red pixel PXr.

As above-described, the red pixel electrode 191r and the red filter may be formed in the red pixel PXr. Likewise, the green pixel electrode 191g and the green filter may be formed in the green pixel PXg, and the blue pixel electrode 191b and the blue filter are formed in the blue pixel PXb.

The green pixel electrode 191g may include a transparent conductive material like the red pixel electrode 191r. The green pixel electrode 191g may include a first sub-pixel electrode 191ga and a second sub-pixel electrode 191gb. The first sub-pixel electrode 191ga and the second sub-pixel electrode 191gb may each have a quadrangular shape (e.g., a square) overall, and may each include transverse stem portions 192ga and 192gb and longitudinal stem portions 193ga and 193gb crossing each other, and fine branch portions 194ga and 194gb extending therefrom. The first sub-pixel electrode 191ga and the second sub-pixel electrode 191gb of the green pixel PXg may be divided into four sub-regions by the transverse stem portions 192ga and 192gb and the longitudinal stem portions 193ga and 193gb. The fine branch portions 194ga and 194gb of the first sub-pixel electrode 191ga and the second sub-pixel electrode 191gb may obliquely extend from the transverse stem portions 192ga and 192gb and the longitudinal stem portions 193ga and 193gb. The angles θga and θgb between the transverse stem portions 192ga and 192gb and the fine branch portions 194ga and 194gb may be from about 35 degrees to about 55 degrees. The transverse stem portions 192ga and 192gb may extend to be substantially parallel to the gate line 121. Accordingly, the angle between the gate line 121 and the fine branch portions 194ga and 194gb may be the same as the angles θga and θgb between the transverse stem portions 192ga and 192gb and the fine branch portions 194ga and 194gb.

The blue pixel electrode 191b may include a transparent conductive material like the red pixel electrode 191r. The blue pixel electrode 191b may include a first sub-pixel electrode 191ba and a second sub-pixel electrode 191bb. The first sub-pixel electrode 191ba and the second sub-pixel electrode 191bb may each have a quadrangular shape (e.g., a square), and may each include transverse stem portions 192ba and 192bb and the longitudinal stem portions 193ba and 193bb crossing each other, and fine branch portions 194ba and 194bb extending therefrom. The first sub-pixel electrode 191ba and the second sub-pixel electrode 191bb of the blue pixel PXb may be divided into four sub-regions by the transverse stem portions 192ba and 192bb and the longitudinal stem portions 193ba and 193bb. The fine branch portions 194ba and 194bb of the first sub-pixel electrode 191ba and the second sub-pixel electrode 191bb may obliquely extend from the transverse stem portions 192ba and 192bb and the longitudinal stem portions 193ba and 193bb. The angles θba and θbb between the transverse stem portions 192ba and 192bb and the fine branch portions 194ba and 194bb may be from about 35 degrees to about 55 degrees. The transverse stem portions 192ba and 192bb may extend to be substantially parallel to the gate line 121. Accordingly, the angle between the gate line 121 and the fine branch portions 194ba and 194bb may be the same as the angles θba and θbb between the transverse stem portions 192ba and 192bb and the fine branch portions 194ba and 194bb.

By differentiating the angles θra, θga, and θba between the transverse stem portions 192ra, 192ga, and 192ba and the fine branch portions 194ra, 194ga, and 194ba of the first sub-pixel electrodes 191ra, 191ga, and 191ba of the each of the pixels PXr, PXg, and PXb, the transmittance may be increased for each of the pixels PXr, PXg, and PXb.

When the first and second polarizers 12 and 22 are the absorption polarizer, it is preferable that the angle θga between the transverse stem portion 192ga and the fine branch portion 194ga of the first sub-pixel electrode 191ga of the green pixel PXg is about 45 degrees, the angle θra between the transverse stem portion 192ra and the fine branch portion 194ra of the first sub-pixel electrode 191ra of the red pixel PXr is from about 41.83 degrees to about 45 degrees, and the angle θba between the transverse stem portion 192ba and the fine branch portion 194ba of the first sub-pixel electrode 191ba of the blue pixel PXb is from about 45 degrees to about 49.75 degrees.

When the first and second polarizers 12 and 22 are the absorption polarizer, it is preferable that the angle θba between the transverse stem portion 192ba and the fine branch portion 194ba of the first sub-pixel electrode 191ba of the blue pixel PXb is about 45 degrees, the angle θga between the transverse stem portion 192ga and the fine branch portion 194ga of the first sub-pixel electrode 191ga of the green pixel PXg is from about 44.27 degrees to about 45 degrees, and the angle θra between the transverse stem portion 192ra and the fine branch portion 194ra of the first sub-pixel electrode 191ra of the red pixel PXr is from about 43.77 degrees to about 45 degrees.

When the first and second polarizers 12 and 22 are the absorption polarizer, it is preferable that the angle θra between the transverse stem portion 192ra and the fine branch portion 194ra of the first sub-pixel electrode 191ra of the red pixel PXr is about 45 degrees, the angle θga between the transverse stem portion 192ga and the fine branch portion 194ga of the first sub-pixel electrode 191ga of the green pixel PXg is from about 45 degrees to about 45.82 degrees, and the angle θba between the transverse stem portion 192ba and the fine branch portion 194ba of the first sub-pixel electrode 191ba of the blue pixel PXb is from about 45 degrees to about 51.5 degrees.

When the first and second polarizers 12 and 22 are the reflective polarizer, the angle θga between the transverse stem portion 192ga and the fine branch portion 194ga of the first sub-pixel electrode 191ga of the green pixel PXg is about 45 degrees, the angle θra between the transverse stem portion 192ra and the fine branch portion 194ra of the first sub-pixel electrode 191ra of the red pixel PXr is from about 43.96 degrees to about 45 degrees, and the angle θba between the transverse stem portion 192ba and fine branch portion 194ba of the first sub-pixel electrode 191ba of the blue pixel PXb is from about 45 degrees to about 46.56 degrees.

When the first and second polarizers 12 and 22 are the reflective polarizer, the angle θba between the transverse stem portion 192ba and the fine branch portion 194ba of the first sub-pixel electrode 191ba of the blue pixel PXb may be about 45 degrees, the angle θga between the transverse stem portion 192ga and the fine branch portion 194ga of the first sub-pixel electrode 191ga of the green pixel PXg may be from about 40.45 degrees to about 45 degrees, and the angle θra between the transverse stem portion 192ra and the fine branch portion 194ra of the first sub-pixel electrode 191ra of the red pixel PXr may be from about 37.41 degrees to about 45 degrees.

When the first and second polarizers 12 and 22 are the reflective polarizer, the angle θra between the transverse stem portion 192*ra* and the fine branch portion 194*ra* of the first sub-pixel electrode 191*ra* of the red pixel PXr may be about 45 degrees, the angle θga between the transverse stem portion 192*ga* and the fine branch portion 194*ga* of the first sub-pixel electrode 191*ga* of the green pixel PXg may be from about 45 degrees to about 47.96 degrees, and the angle θba between the transverse stem portion 192*ba* and the fine branch portion 194*ba* of the first sub-pixel electrode 191*ba* of the blue pixel PXb may be from about 45 degrees to about 49.75 degrees.

By differentiating the angles θrb, θgb, and θbb between the transverse stem portions 192*rb*, 192*gb*, and 192*bb* and the fine branch portions 194*rb*, 194*gb*, and 194*bb* of the second sub-pixel electrodes 191*rb*, 191*gb*, and 191*bb* of each of the pixels PXr, PXg, and PXb, the transmittance for each of the pixels PXr, PXg, and PXb may be increased.

When the first and second polarizers 12 and 22 are the absorption polarizer, the angle θgb between the transverse stem portion 192*gb* and the fine branch portion 194 of the second sub-pixel electrode 191*gb* of the green pixel PXg may be about 45 degrees, the angle θrb between the transverse stem portion 192*rb* and the fine branch portion 194*rb* of the second sub-pixel electrode 191*rb* of the red pixel PXr may be from about 41.83 degrees to about 45 degrees, and the angle θbb between the transverse stem portion 192*bb* and the fine branch portion 194*bb* of the second sub-pixel electrode 191*bb* of the blue pixel PXb may be from about 45 degrees to about 49.75 degrees.

When the first and second polarizers 12 and 22 are the absorption polarizer, the angle θbb between the transverse stem portion 192*bb* and the fine branch portion 194*bb* of the second sub-pixel electrode 191*bb* of the blue pixel PXb may be about 45 degrees, the angle θgb between the transverse stem portion 192*gb* and the fine branch portion 194*gb* of the second sub-pixel electrode 191*gb* of the green pixel PXg may be from about 44.27 degrees to about 45 degrees, and the angle θrb between the transverse stem portion 192*rb* and the fine branch portion 194*rb* of the second sub-pixel electrode 191*rb* of the red pixel PXr may be from about 43.77 degrees to about 45 degrees.

When the first and second polarizers 12 and 22 are the absorption polarizer, the angle θrb between the transverse stem portion 192*rb* and the fine branch portion 194*rb* of the second sub-pixel electrode 191*rb* of the red pixel PXr may be about 45 degrees, the angle θgb between the transverse stem portion 192*gb* and the fine branch portion 194*gb* of the second sub-pixel electrode 191*gb* of the green pixel PXg may be from about 45 degrees to about 45.82 degrees, and the angle θbb between the transverse stem portion 192*bb* and the fine branch portion 194*bb* of the second sub-pixel electrode 191*bb* of the blue pixel PXb may be from about 45 degrees to about 51.5 degrees.

When the first and second polarizers 12 and 22 are the reflective polarizer, the angle θgb between the transverse stem portion 192*gb* and the fine branch portion 194*gb* of the second sub-pixel electrode 191*gb* of the green pixel PXg may be about 45 degrees, the angle θrb between the transverse stem portion 192*rb* and the fine branch portion 194*rb* of the second sub-pixel electrode 191*rb* of the red pixel PXr may be from about 43.96 degrees to about 45 degrees, and the angle θbb between the transverse stem portion 192*bb* and the fine branch portion 194*bb* of the second sub-pixel electrode 191*bb* of the blue pixel PXb may be from about 45 degrees to about 46.56 degrees.

When the first and second polarizers 12 and 22 are the reflective polarizer, the angle θbb between the transverse stem portion 192*bb* and the fine branch portion 194*bb* of the second sub-pixel electrode 191*bb* of the blue pixel PXb may be about 45 degrees, the angle θgb between the transverse stem portion 192*gb* and the fine branch portion 194*gb* of the second sub-pixel electrode 191*gb* of the green pixel PXg may be from about 40.45 degrees to about 45 degrees, and the angle θrb between the transverse stem portion 192*rb* and the fine branch portion 194*rb* of the second sub-pixel electrode 191*rb* of the red pixel PXr may be from about 37.41 degrees to about 45 degrees.

When the first and second polarizers 12 and 22 are the reflective polarizer, the angle θrb between the transverse stem portion 192*rb* and the fine branch portion 194*rb* of the second sub-pixel electrode 191*rb* of the red pixel PXr may be about 45 degrees, the angle θgb between the transverse stem portion 192*gb* and the fine branch portion 194*gb* of the second sub-pixel electrode 191*gb* of the green pixel PXg may be from about 45 degrees to about 47.96 degrees, and the angle θbb between the transverse stem portion 192*bb* and the fine branch portion 194*bb* of the second sub-pixel electrode 191*bb* of the blue pixel PXb may be from about 45 degrees to about 49.75 degrees.

The angles θra, θga, and θba between the transverse stem portions 192*ra*, 192*ga*, and 192*ba* and the fine branch portions 194*ra*, 194*ga*, and 194*ba* of the first sub-pixel electrodes 191*ra*, 191*ga*, and 191*ba* of each of the pixels PXr, PXg, and PXb may be different from each other and the angles θrb, θgb, and θbb between the transverse stem portions 192*rb*, 192*gb*, and 192*bb* and the fine branch portions 194*rb*, 194*gb*, and 194*bb* of the second sub-pixel electrodes 191*rb*, 191*gb*, and 191*bb* of each of the pixels PXr, PXg, and PXb may be different from each other, however exemplary embodiments are not limited thereto.

The angles θra, θga, and θba between the transverse stem portions 192*ra*, 192*ga*, and 192*ba* and the fine branch portions 194*ra*, 194*ga*, and 194*ba* of the first sub-pixel electrodes 191*ra*, 191*ga*, and 191*ba* of each of the pixels PXr, PXg, and PXb may be different from each other, and the angles θrb, θgb, and θbb between the transverse stem portions 192*rb*, 192*gb*, and 192*bb* and the fine branch portions 194*rb*, 194*gb*, and 194*bb* of the second sub-pixel electrodes 191*rb*, 191*gb*, and 191*bb* of each of the pixels PXr, PXg, and PXb may be the same as each other.

The angles θra, θga, and θba between the transverse stem portions 192*ra*, 192*ga*, and 192*ba* and the fine branch portions 194*ra*, 194*ga*, and 194*ba* of the first sub-pixel electrodes 191*ra*, 191*ga*, and 191*ba* of each of the pixels PXr, PXg, and PXb may be the same as each other, and the angles θrb, θgb, and θbb between the transverse stem portions 192*rb*, 192*gb*, and 192*bb* and the fine branch portions 194*rb*, 194*gb*, and 194*bb* of the second sub-pixel electrodes 191*rb*, 191*gb*, and 191*bb* of each of the pixels PXr, PXg, and PXb may be different from each other.

A display device according to an exemplary embodiment will be described in more detail below with reference to FIG. 15 and FIG. 16.

Figure 15:
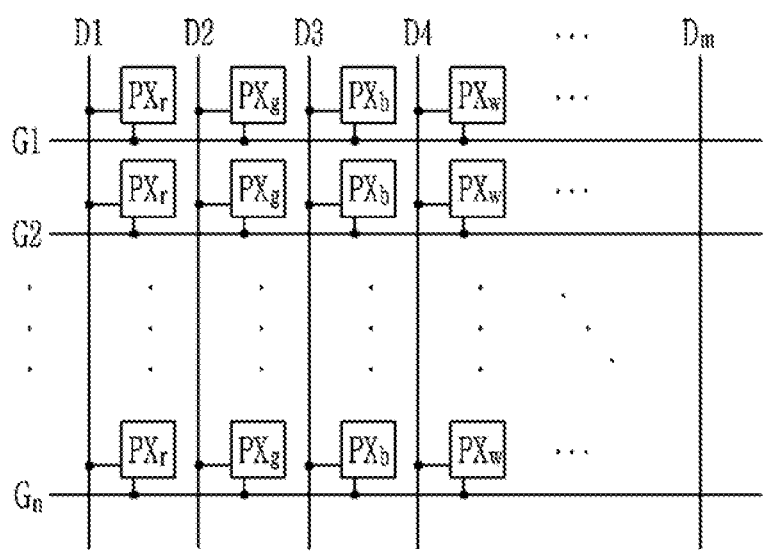
FIG. 15 is a schematic view of a display device according to an exemplary embodiment.
Figure 16:
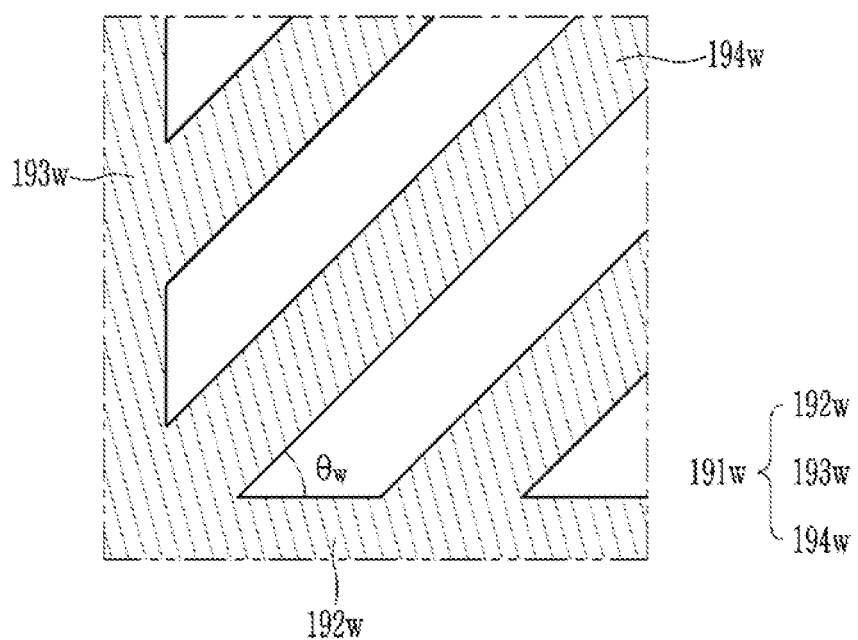
FIG. 16 is a top plan view of one pixel of a display device according to an exemplary embodiment.

The display device according to an exemplary embodiment described with reference to FIG. 15 and FIG. 16 is mostly the same as the display device according to an exemplary embodiment described above with reference to FIG. 1 to FIG. 6 (e.g., except for an inclusion of a white pixel, and thus duplicative descriptions may be omitted below.

FIG. 15 is a schematic view of a display device according to an exemplary embodiment. FIG. 16 is a top plan view of one pixel of a display device according to an exemplary embodiment.

The display device according to an exemplary embodiment may include a plurality of pixels PXr, PXg, PXb, and PXw. The plurality of pixels PXr, PXg, PXb, and PXw may include the red pixel PXr, the green pixel PXg, the blue pixel PXb, and a white pixel PXw. Each of the plurality of pixels PXr, PXg, PXb, and PXw may be connected to one of the gate lines G1, . . . , Gn and one of the data lines D1, . . . , Dm.

One pixel of the display device according to an exemplary embodiment is described with reference to FIG. 16, as an example. FIG. 16 shows a white pixel, as an example.

In the white pixel PXw, the thin film transistor, a white pixel electrode 191w, and the like are formed like the red pixel PXr, the green pixel PXg, and the blue pixel PXb. The white pixel electrode 191w may have a quadrangular shape (e.g., a square) overall, and may include a transverse stem portion 192w and a longitudinal stem portion 193w crossing each other, and a fine branch portion 194w extending therefrom. The fine branch portion 194w may obliquely extend from the transverse stem portion 192w and the longitudinal stem portion 193w. The angle θw between the transverse stem portion 192w and the fine branch portion 194w may be from about 35 degrees to about 55 degrees. The transverse stem portion 192w may extend to be substantially parallel to the gate line 121. Accordingly, the angle between the gate line 121 and the fine branch portion 194w may be the same as the angle θw between the transverse stem portion 192w and the fine branch portion 194w.

In the display device according to an exemplary embodiment, by differentiating the angles θr, θg, θb, and θw between the transverse stem portions 192r, 192g, 192b, and 192w and the fine branch portions 194r, 194g, 194b, and 194w of each of the pixels PXr, PXg, PXb, and PXw, the transmittance for each of the pixels PXr, PXg, PXb, and PXw may be increased.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A display device comprising:
a substrate; and
a red pixel electrode, a green pixel electrode, and a blue pixel electrode disposed on the substrate,
wherein each of the red pixel electrode, the green pixel electrode, and the blue pixel electrode includes a transverse stem portion, a longitudinal stem portion, and a fine branch portion, the transverse stem portion and the longitudinal stem portion dividing each of the red pixel electrode, the green pixel electrode and the blue pixel electrode into a plurality of sub-regions,
an angle between the transverse stem portion and lateral edges of the fine branch portion is constant throughout an entirety of each of the plurality of sub-regions of the red pixel electrode, the green pixel electrode, and the blue pixel electrode, respectively,
entire portions of the transverse stem portion, the longitudinal stem portion and the fine branch portion have straight shapes in each of the red pixel electrode, the green pixel electrode and the blue pixel electrode, respectively,
all angles between the transverse stem portion and the fine branch portion of the red pixel electrode are different from all angles between the transverse stem portion and the fine branch portion of the green pixel electrode, and
all angles between the transverse stem portion and the fine branch portion of the red pixel electrode are different from all angles between the transverse stem portion and the fine branch portion of the blue pixel electrode,
wherein an angle between a first portion of the transverse stem portion and the fine branch portion of the red pixel electrode is smaller than an angle between a first portion of the transverse stem portion and the fine branch portion of the green pixel electrode, and
an angle between a first portion of the transverse stem portion and the fine branch portion of the blue pixel electrode is larger than an angle between the first portion of the transverse stem portion and the fine branch portion of the green pixel electrode.

2. The display device of claim 1, further comprising an absorption polarizer disposed under the substrate.

3. The display device of claim 2, wherein
the angle between the first portion of the transverse stem portion and the fine branch portion of the green pixel electrode is about 45 degrees,
the angle between the first portion of the transverse stem portion and the fine branch portion of the red pixel electrode is from about 41.83 degrees to about 45 degrees, and
the angle between the first portion of the transverse stem portion and the fine branch portion of the blue pixel electrode is from about 45 degrees to about 49.75 degrees.

4. The display device of claim 2, wherein
the angle between the first portion of the transverse stem portion and the fine branch portion of the blue pixel electrode is about 45 degrees,
the angle between the first portion of the transverse stem portion and the fine branch portion of the green pixel electrode is from about 44.27 degrees to about 45 degrees, and
the angle between the first portion of the transverse stem portion and the fine branch portion of the red pixel electrode is from about 43.77 degrees to about 45 degrees.

5. The display device of claim 2, wherein
the angle between the first portion of the transverse stem portion and the fine branch portion of the red pixel electrode is about 45 degrees,
the angle between the first portion of the transverse stem portion and the fine branch portion of the green pixel electrode is from about 45 degrees to about 45.82 degrees, and
the angle between the first portion of the transverse stem portion and the fine branch portion of the blue pixel electrode is from about 45 degrees to about 51.5 degrees.

6. The display device of claim 1, further comprising a reflective polarizer disposed under the substrate.

7. The display device of claim 6, wherein
the angle between the first portion of the transverse stem portion and the fine branch portion of the green pixel electrode is about 45 degrees,
the angle between the first portion of the transverse stem portion and the fine branch portion of the red pixel electrode is from about 43.96 degrees to about 45 degrees, and the angle between the first portion of the transverse stem portion and the fine branch portion of the blue pixel electrode is from about 45 degrees to about 46.56 degrees.

8. The display device of claim 6, wherein
the angle between the first portion of the transverse stem portion and the fine branch portion of the blue pixel electrode is about 45 degrees,
the angle between the first portion of the transverse stem portion and the fine branch portion of the green pixel electrode is from about 40.45 degrees to about 45 degrees, and
the angle between the first portion of the transverse stem portion and the fine branch portion of the red pixel electrode is from about 37.41 degrees to about 45 degrees.

9. The display device of claim 6, wherein
the angle between the first portion of the transverse stem portion and the fine branch portion of the red pixel electrode is about 45 degrees,
the angle between the first portion of the transverse stem portion and the fine branch portion of the green pixel electrode is from about 45 degrees to about 47.96 degrees, and
the angle between the first portion of the transverse stem portion and the fine branch portion of the blue pixel electrode is from about 45 degrees to about 49.75 degrees or less.

* * * * *